Patented Oct. 9, 1934

1,976,433

UNITED STATES PATENT OFFICE 1,976,433

EMULSION AND ITS PREPARATION

Harold C. Cheetham, Milwaukee, Wis., assignor to Bakelite Corporation, New York, N. Y., a corporation of Delaware No Drawing. Application April 20, 1932, Serial No. 606,523

9 Claims. (Cl. 134—26)

This invention relates to suspensions or emulsions of phenolic condensation products with non-solvent liquids, and to methods of preparing them.

For many purposes in the arts it is desirable to have and to use resinous phenolic condensation products in emulsified or suspended form rather than as solutions. This is particularly true for water emulsion or suspensions by which the use of costly and combustible solvents is largely eliminated and yet the resinous material does not have to be solubilized as with alkalies to obtain the desired fluidity.

The known practice of making phenolic condensation products is that of reacting the ingredients, such as phenol or cresol and formaldehyde under heat, which reaction is accompanied by a progressive polymerization from the initial stages to the final product. It is necessary for utilization of such products that the reaction be arrested before completion, for otherwise the product cannot be manipulated to accomplish useful results. On the other hand it is highly desirable that the reaction proceed as fas as possible toward a final condition since the manipulative processes for molding or shaping products therefrom are thereby greatly accelerated. It is therefore customary to react as far as possible and then to cool the reaction mass by running it in shallow layers into metal pans but as a rule it is difficult and practically impossible to do this quickly or accurately enough to obtain repeatedly the same end point.

According to the present invention, the condensation or other reaction is brought with closeness to a desired end point and then held there by running directly from a reaction zone into a liquid with which it is to be emulsified or suspended and simultaneously effecting emulsification or dispersion sufficient to stop the reaction. The simplicity of the process and the low cost of carrying it out are manifest. The suspension step immediately stops the reaction of the materials thus providing an excellent control of the end point; and at the same time the labor, uncertainty and material cost of completing the manufacture of the condensation product in the usual way by dehydrating, cooling, grinding and then dispersing are eliminated. Suspensions made in this manner can be controlled so as to have either the water or the condensation product as the disperse phase; but preferably the water is the continuing phase so that suspensions may be extended with more of the water until they have the viscosity desired for the particular uses to which they are to be applied.

Other objects and features of the invention will more fully appear from the following claims taken in conjunction with the description and examples which, however, must be considered as merely illustrating and in no way limiting the invention thereto.

According to my invention, a phenolic body, such as phenol, cresol, naphthol, resorcinol, etc. or their homologs, derivatives, or compounds and a methylene-containing agent, such as formaldehyde, paraform, furfural, acrolein or their polymers or derivatives, are heated in the usual manner to yield phenolic condensation products until the desired state is reached. The terms "phenolic condensation products" or "phenolic resins", are also intended to embrace such products modified by additions, such as fatty oils, which can be so combined as to form a part of the phenolic condensation products. The point to which the condensation reaction is allowed to progress depends upon whether the resin as contained in the suspension is to be a soft, sticky or even liquid material, or one that is normally a brittle resin such as would be ground in a ball mill, or a resinous material in any other stage, as a resin well advanced to the infusible and insoluble stage when of the reactive type.

A quantity of water containing a suitable stabilizing agent, if required, has been prepared in the meantime, and the condensation product is run hot directly from the reaction vessel or zone into the water with agitation to break up the resin. The agitation if sufficient results in an emulsion or suspension without further treatment; but the resin and water mixture can be run through a suitable colloid mill to further increase the dispersion, or if the resin particles are rendered solid in cooling, the mixture can be subjected to wet grinding methods, such as a pebble mill process, to reduce the particles. As the condensation products usually disperse more easily when hot, the water may, if necessary, be preliminarily heated; but this depends upon the quantity of water, the temperature being such in relation to the quantity of water and the quantity and temperature of the condensation product that when the two are mixed, the reaction is halted and the water and product are at the optimum or dispersion temperature. The water may, if desired, contain some other ingredient either in solution or as a suspension, to be mixed with the condensation product; for instance the water may contain additional amounts of the phenolic body or the methylene agent, such as hexamethylene-tetramine; other possible admixtures are rubber latex, pigments, stearic acid, etc. In case the condensation product is non-heat reactive, the additional methylene agent results in a suspension of a product that is heat-hardenable, but so long as the ingredients are in dispersed form, there is no further condensation reaction or tendency to harden. Hexamethylenetetramine makes the water basic or at least non-acidic, which facilitates dispersion; but other non-methylene bases may be used in the presence or absence of hexamethylenetetramine. As the condensation products almost always contain some of the unreacted phenol and/or aldehyde ingredients, and the reaction water is proportionately charged therewith, the dispersion water may be the water of reaction from a previous resin batch suitably treated with a stabilizing agent or other material as previously stated.

Suspensions can also be had of modified phenolic resins such as compositions including fatty oils. For example a resin prepared from cresol and formaldehyde can be made soluble in fatty oils by heating the resin for a prolonged period with an equal amount of rosin, and the resulting product is then cooked with a fatty oil; or a phenol and a fatty oil are heated until a complex body is formed which can be reacted with an aldehyde to give a resin; or a cresol, a fatty oil and an aldehyde or derivative together with a non-phenolic resin are mixed together and then reacted. To form suspensions from them, the reaction or heating is carried to the extent required and immediately stopped by running the mass into water and the suspension made simultaneously.

Following are specific examples of methods of procedure in accordance with this invention. It is to be understood that the examples are illustrative of only a few of the many different procedures involving changes of ingredients, types of products formed, etc., which may be utilized.

Example 1

A reactive phenolic-aldehyde resinous material is formed by reacting 100 parts by weight of phenol or cresol with 80 parts of 37½ per cent formaldehyde solution with ¼ part by weight of NaOH for thirty to ninety minutes under reflux, depending among other conditions upon whether the condensation product would normally be a liquid or a solid if dehydrated and cooled in the usual way; in this reaction a separation into water and resin occurs. This resinous material is then run directly from the still into water containing an emulsifying or stabilizing agent, the proportions, for example, being approximately 33 parts by weight of resin for 66 to 200 parts of water and 1 to 10 parts of gum arabic; the percentage of water entrained with and the viscosity of the resinous material as well as the ease with which it emulsifies or disperses and the stability desired are factors which govern the proportions of water and stabilizer. During or after the mixing of the water and resinous material the mixture can be passed through a colloid mill, yielding a milky, mobile, non-sticky, substantially neutral emulsion or suspension which may be diluted to any extent by water.

Example 2

A non-reactive phenolic-aldehyde resinous material is formed by reacting 100 parts by weight of phenol or cresol with 70 parts of 37½ per cent formaldehyde solution with 1 per cent oxalic acid by weight for 1 to 10 hours under reflux depending upon the product desired. It is then emulsified or dispersed as in the preceding example in water containing an agent, such as gum arabic, the proportions being substantially 50 parts by weight of the resinous material for 50 to 200 parts of water containing 1 to 10 parts of gum arabic. The resulting suspension is very fluid and stable, and sufficient hardening agent, for example hexamethylenetetramine, to render the resin reactive may be dissolved in either the water or the suspension without danger of precipitation.

Example 3

A cresol-fatty oil-methylene resin is made from equal parts of cresol and formaldehyde solution, a proportion of tung oil that can vary from 10 per cent to 200 per cent by weight based on the cresol, and about 20 per cent as much rosin as cresol. These ingredients are refluxed together to effect condensation and then dehydrated; further heating is applied to bring the composition to the desired viscosity. It is then directed into water made ammoniacal and containing casein as a stabilizing agent; for instance a thick emulsion follows from 12 parts of resin added to 1 part of ammoniacal water containing about 2 per cent of casein based on the weight of the resin. The emulsion can be thinned to any extent with water.

The emulsions or suspensions thus formed can be used like solutions for coating various materials or mixing with fillers to form hot or cold molding compositions. They have several advantages, however, over solutions; in addition to those of elimination of solvents and fire hazard previously mentioned, is that of yielding a non-sticky fluid product of high resinous content from liquid resin products which in themselves are sticky. In contrast therewith, when such resins are thinned with liquid of a nature that overcomes stickiness the resinous content is much reduced while the liquid content, which is either lost or must be recovered, is relatively high.

These emulsions or suspensions can be made so as to have varying degrees of stability. When fully stabilized they can be extended with water or concentrated for they withstand boiling temperatures which facilitates concentration. They can be broken, however, by certain precipitants, for instance gas-black or electrolytes, such as ferric chloride, alum, tribasic sodium phosphate, etc.

Agents found suitable as stabilizing agents are, as the above examples indicate, gum arabic, glue, casein and the like; but camphor, tannic acid, starch, soaps, clays, organic acid salts, etc. generally are useful in promoting suspensions. However, casein, and agents similarly affected by uncombined formaldehyde, are practically restricted to use with resins substantially free from uncombined formaldehyde or resins which have been treated by ammonia or the like to combine with the free formaldehyde content prior to dispersing the resins. In oil-modified resins formaldehyde is usually combined or its effect so neutralized that it does not destroy the stabilizing property of casein.

On the other hand the action of formaldehyde (furfural and uncombined aldehydes act similarly to formaldehyde in this respect) can be applied to advantage in connection with suspensions. Phenolic resins find their principal applications in coating or impregnating sheet materials or in binding fibrous or non-fibrous comminuted fillers, and the resulting compositions are submitted to the action of heat and pressure in molds to form finished articles. Casein in amounts generally used for suspensions for example, is found to have no undesirable effects on molding properties of compositions containing them or on the appearance, strength, water absorption, etc. of products made therefrom. To the contrary, advantages follow from its inclusion. In incorporating formaldehyde in solution or otherwise with a filler prior to the addition of a casein stabilized resin suspension, precipitation of the resin results upon the mixing of the filler and suspension with the consequence that the resin is brought into intimate and distributed contact with the filler. Or the filler and suspension can be mixed together and formaldehyde passed through (or furfural added) to precipitate the resin. Lime water can also be used to destroy the casein-stabilized suspension. The casein-aldehyde product or calcium caseinate are non-sticky, rather flocculent precipitates that adhere to the pulp or filler together with the precipitated resin. The aldehydic constituent is in addition a promoter of the hardening of the resin during a subsequent heating of the composition. After precipitation the water or non-solvent liquid can be removed.

For obvious reasons, water is the preferred non-solvent liquid used as a suspending medium. Where circumstances dictate, however, other liquids such as the paraffin hydrocarbons can be used.

In the previous description suspensions of resins are disclosed as well as resins modified by fatty oils. It should be understood, however, that various other materials, such as other oils, rubber latex, hydrocarbons, rosin, rosinates and the like may, either be included with the resinous product before dispersion or be added to and become a part of a composite suspension. The properties of the suspension and the composition to be precipitated therefrom may thus be varied according to the kind and amount of the phenolic body, presence or absence of methylene agent or other ingredients to give suspensions of heat-reactive, non-reactive or modified condensation products and yield hard or soft, plastic or brittle, strong or weak, soluble or insoluble products upon precipitation and heating or other treatment.

The particle sizes of the dispersed liquid or solid resin phase, as hereinbefore intimated, are controlled by the temperature of the water condition of the resin, extent of agitation and the like. They can be varied in the case of liquid resins from coarse globules as large as 50 microns down to colloidal particles of 200 to 500 millimicrons. In making dispersions of resins normally solid at room temperatures particles of sizes as large as one-quarter inch or larger can be formed, which are thereupon reduced in a pebble mill to give stable suspensions; or with sufficient agitation applied as the molten resin is directed into the water, particles varying from 100 to 500 mesh can be obtained.

The term "suspension" is used in the claims to denote the mobile, milky, non-sticky, substantially neutral aqueous liquids containing discrete particles of phenol resins in a liquid, semi-solid or solid condition such as are obtained by dispersing phenol resins in an aqueous medium in accordance with the invention.

The present application is a continuation of my application Serial No. 29,621, filed May 11, 1925, now Patent No. 1,855,384, dated April 26, 1932.

I claim:

1. Method of preparing a suspension containing a heat-reactive phenolic resin which comprises reacting a phenolic body and a methylene agent to form a resinous product, and then running the reaction product directly from the reaction zone into water to form a suspension and simultaneously arrest the reaction.

2. Method of preparing a suspension containing a potentially reactive phenolic resin which comprises reacting a phenolic body and a methylene agent to form a resinous product, and then running the reaction product into a liquid at a temperature materially below that at which the reaction progresses, and simultaneously forming an emulsion.

3. Method of preparing heat-hardenable resin-containing suspensions which comprises reacting resin-forming ingredients to a given end point, transferring the resin so formed directly from the reaction zone into an emulsifying liquid, and simultaneously causing emulsification to occur in the liquid to thereby arrest the resin reaction.

4. Method of preparing a suspension of a heat-reactive phenolic resin which comprises transferring the resin from a reaction zone into a non-solvent liquid including a stabilizer, and forming a suspension of the resin and liquid.

5. Method of preparing compositions containing a heat-hardenable phenolic resin which comprises forming a suspension of the resin in a non-solvent liquid containing casein, incorporating a filler with the suspension, and causing precipitation of the resin on the filler by the action of an aldehyde.

6. A suspension of a heat-hardenable artificial resin having the resin phase in a state of reaction substantially identical with the state at which it was discharged from a reaction zone.

7. A suspension of a potentially reactive phenolic condensation product with a non-solvent liquid, having the product dispersed in substantially the same state of reaction as when discharged from a reaction zone.

8. Composition comprising in combination a filler and a phenolic resin distributed thereon from a casein-stabilized suspension by means of an uncombined aldehyde.

9. Method of preparing a resin which comprises reacting resin forming reagents to form a resinous product in the desired state of resin formation, arresting the resin-forming reaction and forming a suspension by running the hot reaction product from the zone of resin formation into a suspending liquid held at a lower temperature and simultaneously forming a suspension whereby is obtained a suspension having the resinous product in substantially the same state of resin formation as it was in the reaction zone but in a condition where there is substantially no continuing reaction.

HAROLD C. CHEETHAM.